Oct. 11, 1966 S. J. MIKINA 3,278,773
DYNAMOELECTRIC MACHINE HAVING VIBRATION DAMPED FRAME
AND VIBRATION DAMPING APPARATUS FOR USE THEREIN
Filed Aug. 20, 1963 5 Sheets-Sheet 1

WITNESSES
Theodore F. Wrobel
James H. Young

INVENTOR
Stanley J. Mikina
BY Maury I. Hull
ATTORNEY

United States Patent Office 3,278,773
Patented Oct. 11, 1966

3,278,773
DYNAMOELECTRIC MACHINE HAVING VIBRATION DAMPED FRAME AND VIBRATION DAMPING APPARATUS FOR USE THEREIN
Stanley J. Mikina, Penn Hills Township, Allegheny County, Pa., assignor to Westinghouse Electric Corporation, Pittsburgh, Pa., a corporation of Pennsylvania
Filed Aug. 20, 1963, Ser. No. 303,264
10 Claims. (Cl. 310—51)

This invention relates to improvements in vibration damped dynamoelectric machines, and more particularly to machines employing friction damping for suppressing one or more of a large number of resonant frequencies corresponding to one or more of the natural modes of vibration of the frame.

As will be readily understood by those skilled in the art, one principal cause of so-called "magnetic noise" in dynamoelectric machines is the vibration of the stator frame of a motor or generator by periodic magnetic forces acting between the poles of the field and the slotted surface of the iron armature. Such noise occurring at slot frequency and its harmonics or at pole frequency and its harmonics can become objectionably loud at frame resonance when a disturbing force frequency coincides with the natural vibration frequency of the stator frame.

Accordingly, generally speaking, visable speed dynamoelectric machinery presents a difficult problem in damping of vibrations, because within the range of possible speeds encountered as the speed of the machine is varied from starting to full load or no load conditions, the frame may vibrate in a number of different modes, and vibrations of considerable amplitude may be set up in the frame at a number of resonant frequencies.

Salient pole direct current submarine propulsion motors are one class of such dynamoelectric machines in which the number of modes of vibration within the range of excitation can be rather large. Since such propulsion motors are required to operate over a wide range of speeds, a condition of resonance between the disturbing magnetic forces and frame natural frequency is sometimes unavoidable at some point in the operating range. Nevertheless, by proper damping according to teachings hereinafter set forth, much can be done to minimize vibration and to minimize the production of noise. The frame amplitudes of vibration at resonance are determined by the magnitudes of the disturbing forces and by the amount of frame damping present in a given mode of vibration. In accordance with practices known in the art, this invention does not preclude the use of means to minimize the disturbing magnetic forces by such expedients as slot or pole skewing, the proper choice of slot-pole ratio, and the use of closed or partially closed slots with magnetic wedges.

Such steps to minimize disturbing magnetic forces are particularly helpful in reducing frame vibration at off resonance conditions, but the high amplitude magnification possible in resonant vibration makes desirable the introduction of additional damping into the system for limiting resonance peaks. The invention described and claimed herein is a simple and effective Coulomb friction damper which is theoretically capable of limiting the resonance peak in any mode of non-extensional frame vibration to the low value of $\pi$ times the static vibration amplitude or static displacement.

The peak amplitude in existing machines which operate at resonance or pass through it slowly during a speed change is determined by the amount of damping initially present in the system. Such energy absorbing forces are usually merely the comparatively small effects due to dissipation in the machine structure joints or in the foundation. As a result, comparatively large resonance peaks of mechanical vibrations are observed in the usual machine and provide a most noticeable contrast with respect to noise just a short way from the resonance peak. In absolute value, such resonant amplitudes are not large, being of the order of a mil or less, but they nevertheless represent a source of noise in a submarine which is capable of detection by Sonar and must therefore be eliminated. It is this low absolute value of the vibration which has in the past rendered difficult the job of damping it properly by prior art devices and methods. Viscous dampers are impractical because of the low vibration velocities involved. Moreover, the elastic compliance of any dashpot mounting would take up most of the frame amplitude without providing any energy dissipation.

It will readily be seen by those skilled in the art that what is desired or required is a force opposing the vibratory velocity of the frame which can reach its peak value after only a small fraction of the final steady state amplitude of frame deflection, the peak value of which is independent of the low magnitude of the vibratory velocity, which will not be nullified by any lost motion or elastic give of its points of application, and which will be automatically effective against any one of the several possible modes of frame vibration. Only by utilizing a damping force developed as taught in this application, that is, by utilizing the Coulomb friction properties of two rigid sliding surfaces can a damping force meeting these requirements be obtained.

In summary, the apparatus of the instant invention damps vibrations in all of the possible modes of vibration by means of Coulomb friction forces developed between the stator frame and a pair of rigid rings coupled to the frame at or near the frame ends. The radial dimension of the damper rings is made large enough to make the ring stiffness larger, and the natural frequencies of the ring considerably higher, than those of the stator frame. Consequently, during frame vibration the damper rings serve as a virtually immovable ground relative to which the frame vibrates. Clamping forces between rings and frame, therefore, result in radial frictional forces impeding the vibratory motion of the stator frame.

A primary object of the invention is to provide a new and improved dynamoelectric machine having a vibration damped frame.

Another object is to provide a new and improved vibration damped frame in which the vibration damping effect is applicable over a wide range of resonant frequencies as the machine is set in vibration in a number of modes as the speed thereof increases or decreases.

Another object is to provide vibration damping apparatus utilizing friction forces.

A still further object is to provide a vibration damped frame for dynamoelectric machines characterized by simplicity of construction, reliability, and the automatic application of vibration damping forces when the vibration reaches or exceeds a predetermined level.

These and other objects will become more clearly apparent after a study of the following specification, when read in connection with the accompanying drawings, in which.

Referring now to the drawings, in which like reference numerals are used throughout to designate like parts, for a fuller understanding of the invention, and in particular to FIGS. 1A to 1H thereof, there is shown at 15 a stator frame having by way of illustration four poles 16. It should be understood, however, that the principles of operation of the invention as described and claimed herein are not limited to four pole devices.

Figure 1A:
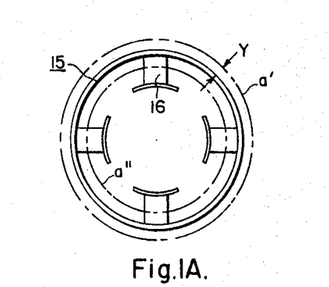
FIGURES 1A to 1H inclusive illustrate eight different modes of vibration of a typical four pole dynamoelectric machine.

In FIG. 1A, the poles 16 all translate radially in phase, and the frame diameter changes periodically while remaining substantially circular. This mode of vibration is common to symmetrical salient pole stators; the frame diameter changes periodically from the diameter of frame 15 to, for example, the diameter of dashed circle $a'$ which represents the maximum diameter of the expanded frame, and to dashed circle $a''$ which represents minimum diameter.

Figure 1B:
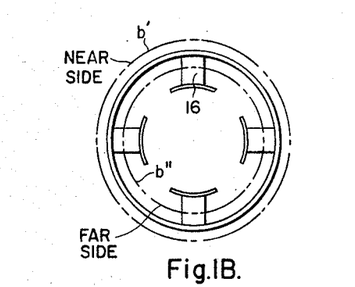

In FIG. 1B, the ends of the frame move as in FIG. 1A but the ends are 180° out of phase. The frame thus does not remain cylindrical in this mode of vibration, but becomes the frustum of a cone whose base alternates between the two ends of the frame. The near side of the frame is shown by the dashed line $b'$ while the far side of the frame is shown by the dashed line $b''$.

Figure 1C:
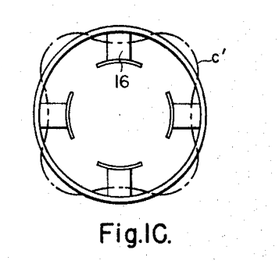

In FIG. 1C, the frame assumes a four-lobed configuration with the poles translating radially with a small sector of the frame, and with the frame sector between the poles translating radially out of phase with the pole motion. The frame motion is indicated by the dashed line $c'$.

Figure 1D:
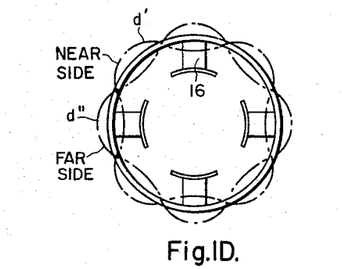

In FIG. 1D, the mode of vibration is a four-lobed frustum of a cone, with the frame ends moving like those in FIG. 1C but 180° out of phase. The near side of the frame in FIG. 1D is indicated by the dashed line $d'$, while the far side is indicated by the dashed line $d''$.

Figure 1E:
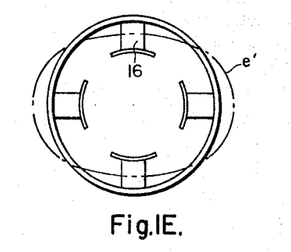

In FIG. 1E, the frame assumes an elliptical shape with the poles at the major and minor axes of the ellipse, the shape of the frame being indicated by the dashed line $e'$.

Figure 1F:
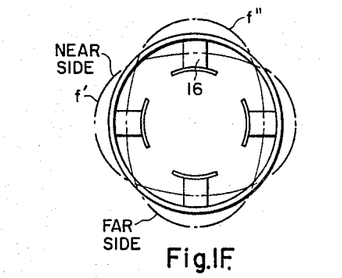

In FIG. 1F, the vibration shape is a two-lobed frustum of a cone with the frame ends moving 180° out of phase, the near side being shown by the dashed line $f'$ and the far side being shown by the dashed line $f''$.

Figure 1G:
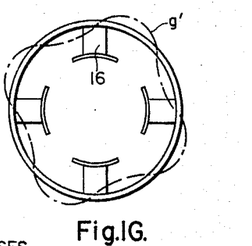
Figure 1H:
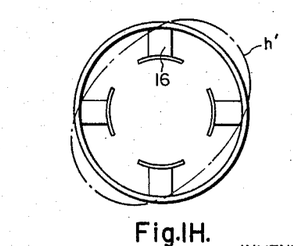

In FIG. 1G, the frame vibration shape is a four-lobed cylinder with the poles rocking angularly at the radial nodes of the frame. The axes of pole rotation are parallel to the frame axis. This movement is indicated by the line $g'$.

In FIG. 1H, the poles are again at the radial nodes of an elliptical mode of vibration, and rotate about axes parallel to the frame axis of symmetry. This motion is indicated by the dashed line $h'$.

In all of these possible vibration modes for a symmetrical stator, the axial ends of the frame move with large or with maximum amplitudes. Accordingly, the frame ends are the most convenient choice for the application of frictional damping forces. As will become more clearly apparent hereinafter, such damping forces are introduced in the apparatus of the instant invention without any substantial reactions on the machine foundation, by using a symmetrical ring at each end of the stator for one friction surface.

Figure 2:
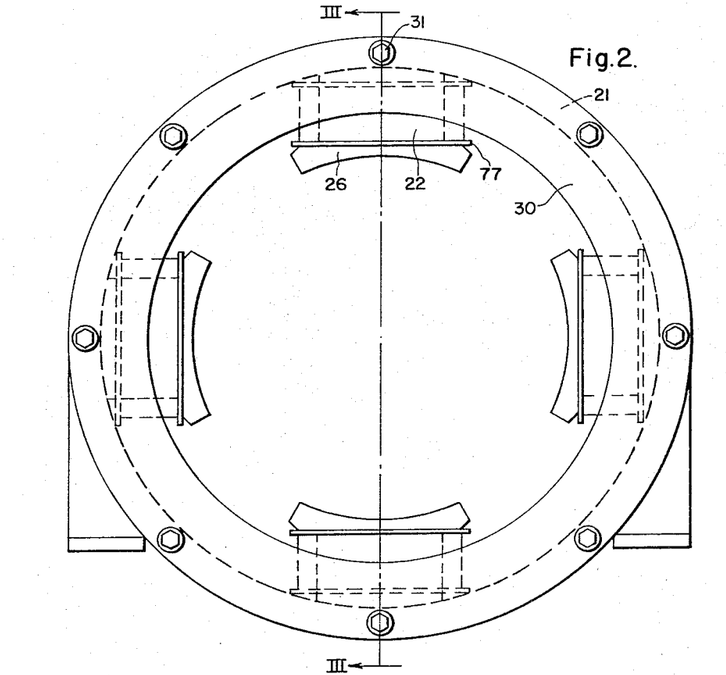
FIG. 2 is an end elevation of a frame having a vibration damping ring attached thereto in accordance with one embodiment of the invention.

Particular reference is made now to FIG. 2, in which an end elevational view of a stator having a damping ring mounted thereon in accordance with one embodiment of the invention is shown. In FIG. 2, the reference numeral 21 indicates the stator of a conventional four pole machine having poles 22 with pole faces 26, and windings 77, respectively. It will be understood that the poles are attached to the stator 21 by any convenient means, not shown, for example bolts. Secured to the end of the frame is a damping ring 30 which is held to the frame by bolts 31 which pass through bores, not shown in FIG. 2, in the damping ring 30 and thence into threaded bores, not shown in FIG. 2, in the frame.

Figure 3:
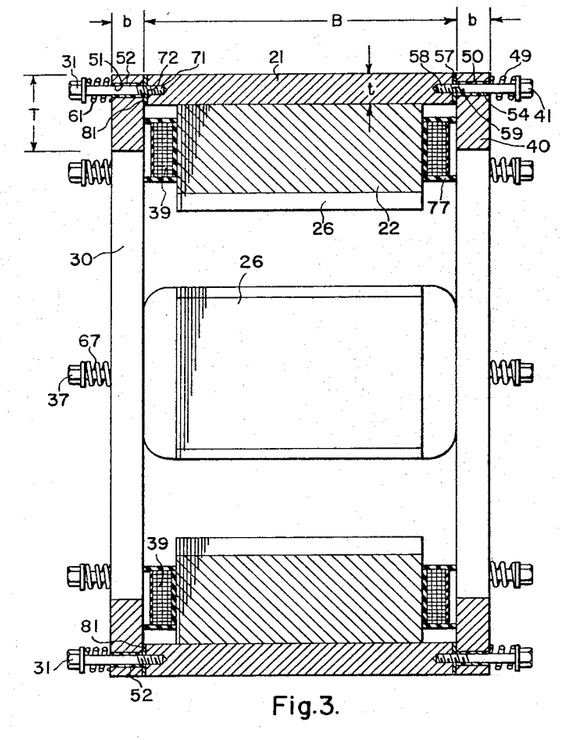
FIG. 3 is a cross sectional view in a vertical plane containing the line III—III of FIG. 2.

Particular reference is made now to FIG. 3, a cross sectional view through the line III–III of FIG. 2. It is seen that the frame has a damper ring 40 on the other end of the frame corresponding to similar damper ring 30, ring 40 being secured to the frame in a similar manner by bolts, some being shown in FIG. 3 and designated 41. In FIG. 3, upper and lower poles 22 are shown in cross section, each having a coil 39 disposed thereon while the pole faces 26 are shown in elevation. The damper rings are shown in FIG. 3 to have an axial breath "$b$," whereas the frame including the thickness of washers hereinafter to be described is shown as having an axial breath "$B$." Ring 30 has a radial thickness "$T$," whereas the radial thickness of the stator frame is "$t$." Extreme upper and lower bolts 31 are seen to extend through bores 51 and to have sleeves of elastomeric or resilient material 52 therearound, separating the bolts from the walls of the bores. The springs 61 apply tension between the outer wall of the damping ring 30 and the respective bolt heads, to force ring 30 against the washers and hence force the washers against frame 21. The washers may be composed of resilient material, cone shaped at a very small angle, so that under pressure they lie substantially flat. The washers may have radial slots therein if desired. The threaded ends 71 of bolts 31 are seen to be in threaded engagement in threaded bores 72 in the frame member 21. In FIG. 3, the washers 81 disposed around the ends of bolts 31 are the means for applying the Coulomb friction forces between the damping ring 30 and the frame 21 of the dynamoelectric machine. As aforementioned, these conical spring washers 81, which may be a type known generally in the trade as Belleville washers, are designed to be clamped nearly flat in their operating positions. It is seen from FIG. 3 that each damper ring is coupled to the dynamo frame by means of radial frictional forces only which are caused to appear whenever the frame moves relative to a ring. As aforementioned, in order to produce the aforementioned necessary radical Coulomb forces opposing the frame vibration, the rings are clamped against the stator ends by axial bolts aforementioned acting through helical springs to produce the required clamping force and no more. Each ring is centered on its mounting bolts by the aforementioned isolating compliant sleeve, two of these sleeves being shown at 52 these sleeves being composed of Teflon, neoprene, or other low modulus elastic material. Since the disturbing magnetic forces are distributed around the stator with the pole spacing, it is advantageous similarly to distribute the damping forces by providing mounting bolts for each ring at the poles and halfway between the poles as shown in FIG. 2 and FIG. 3. To provide damping forces at each bolt location, the aforementioned Belleville conical spring washers are interposed between the frame and the ring. The conical Belleville washers are as aforementioned designed to be clamped nearly flat in the operating positions where they will have the maximum radial rigidity, for causing sliding on the damper ring surface even with minute vibratory input displacements at the stator frame ends.

In order to provide maximum damping effect, the relative motion between the frame and damper ring results in sliding at the contacting surfaces rather than in elastic deflection of intervening or clamping members. For this reason, the high shear rigidity of the nearly flat Belleville spring washers is effective in its plane for transmission of frame displacements to cause rubbing against the ring surface while at the same time its axial flexibility will produce a fixed normal force between the friction surfaces at each bolting point independent of damper ring warping out of its plane.

Particular reference is made again to FIG. 3, where it is seen that the damper ring 40 on the opposite side of the frame 21 from the aforementioned ring 30 is secured by an equal number of bolts substantially in alignment with the bolts securing the damper ring 30, these bolts being shown at 41 in FIG. 3, each of the bolts being under the tension of an adjacent spring and passing through an elastomeric sleeve of neoprene of other suitable material, thence through a conical Belleville washer and having the threaded end of the bolt in threaded engagement in the threaded bore in the adjacent side of the frame 21. Bolt 41, for example, has spring 49, and passes through bore 50 in damper member or ring 40, bore 50 being lined with resilient sleeve 54, washer 57 being positioned between the damper member and frame. Threaded bolt end 58 is in threaded engagement in threaded bore 59.

Figures 4, 5, 6, 7:
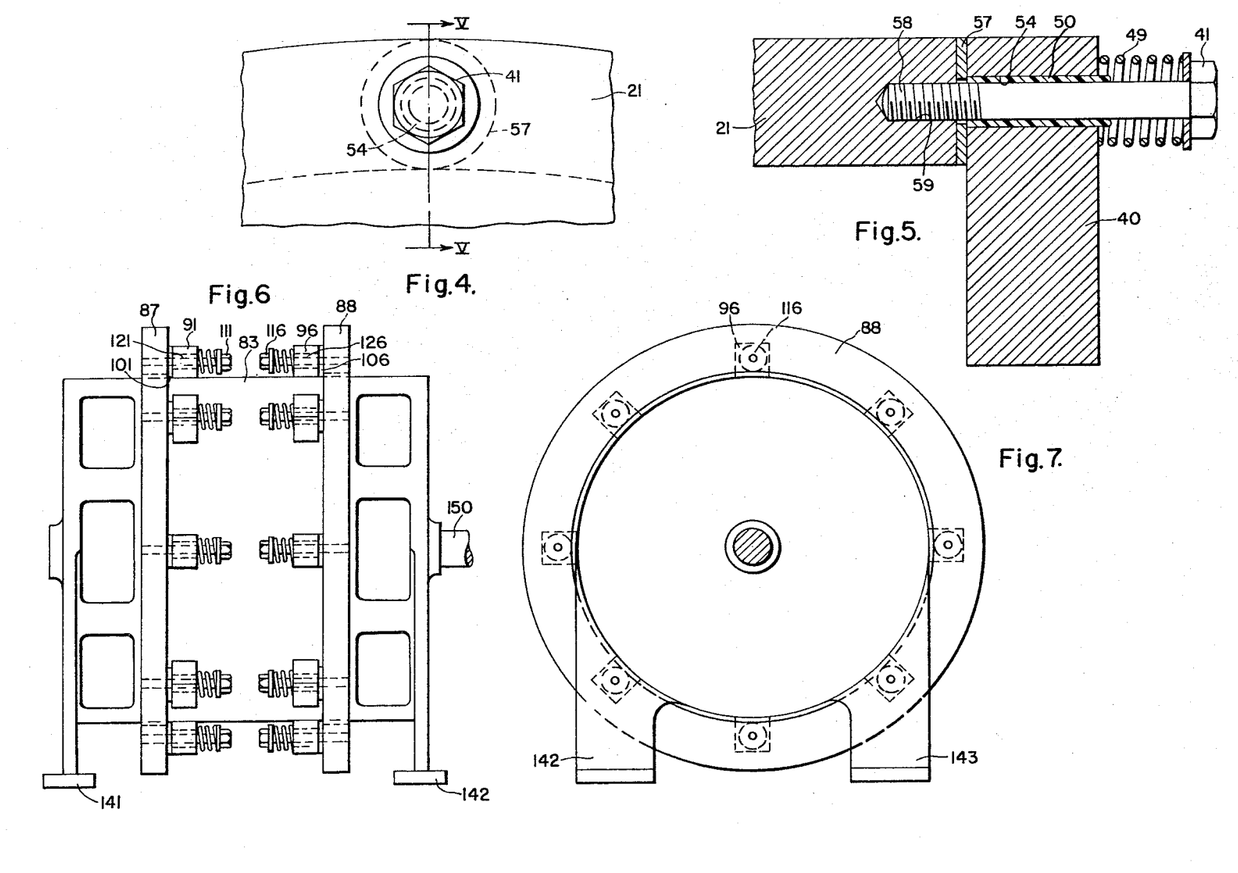
FIG. 4 is a detailed view of one of the bolts for attaching the damper ring of FIG. 3.
FIG. 5 is an additional detailed view of the ring-attaching bolt and adjacent parts of FIG. 3.
FIG. 6 is a side elevational view of a second embodiment of the invention.
FIG. 7 is an end view of the second embodiment of the invention shown in FIG. 6.
Figure 8:
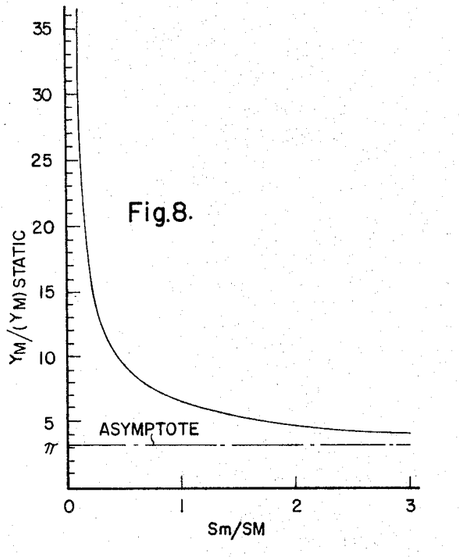
FIGS. 8, 9, 10, 11, 12 and 13 are graphs illustrating the operation of the apparatus of FIG. 3 and FIG. 6.

Particular reference is made now to FIG. 4 and FIG. 5 which show details of the frame clamping arrangement. It is seen again that the Belleville washers are designed to be clamped nearly flat in the operating position, where they will have the maximum radial rigidity for causing a sliding of the damper ring surface even with minute vibratory input displacements. For reasons which will become more clearly apparent hereinafter, in order to achieve a satisfactory reduction in frame resonant peaks, the damper rings are designed to have a radial bending stiffness at least equal to, and preferably several times greater than, the frame stiffness in its various modes of vibration. "Stiffness" as employed herein is the reciprocal of elastic compliance. While this condition exists, large relative motions will occur between frame and ring for each mode of vibration with consequent large energy dissipation at the sliding surfaces. These relationships are shown in FIG. 8, which will hereinafter be discussed in greater detail.

Since the damper rings are, as shown, circularly symmetrical like the stator frame, they provide effective Coulomb damping forces automatically against whatever frame modes are excited, whether such modes occur singly or in groups, or at various frequencies. Any frame antinode will rub radially against the frictionally coupled ring surface immediately adjacent. For symmetrical modes such as depicted in FIG. 1A to FIG. 1H inclusive, all frictional forces will be in balance and there will be no substantial reaction at the machine base or foundation.

In theory the Coulomb friction force developed between each normally loaded frame and ring surface element is a non-linear quantity which always opposes the relative sliding velocity between the surfaces, but is substantially independent of the magnitude of the velocity. Because of its non-linear characteristics it is convenient for the purposes of this description to analyze the damper performance on an energy basis rather than by consideration of force equilibrium.

Figure 11:
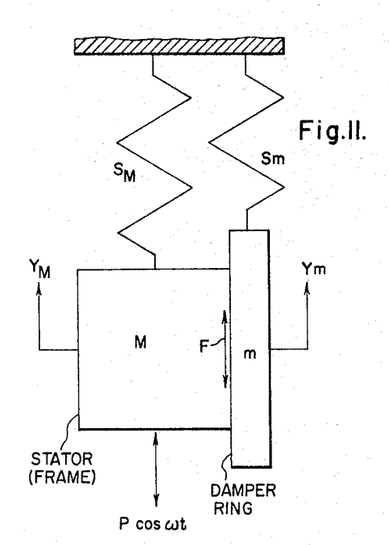

Particular reference is made now to FIG. 11. The action of the damper rings against any particular mode of frame vibration can be represented by the relations obtaining in the single degree of freedom system shown in the drawing of FIG. 11. The effective frame mass and bending stiffness corresponding to the given frame mode are denoted by M and $S_M$, respectively, as if they represented the single mass hung from the spring in FIG. 11. M is subjected to a periodic disturbing force $P \cos \omega t$. The damper rings are represented by the mass $m$ on a supporting spring of stiffness $S_m$ and coupled to M by a Coulomb friction force of magnitude F. For purposes of explanation, let the displacement of M be $y_M$ and that of $m$ be $y_m$. Assume that M and $m$ are frictionally coupled before force P is applied. The disturbing magnetic force P subsequently sets the system into vibration. Let the displacement $y_M$ be represented by the sine curve of FIG. 12 to which particular reference is made. Following the motion of M from its initial point 1, it is noted that the damper mass will move with M without relative sliding until a system deflection $y_1$ is reached at point designated 2, such that $S_m y_1 = F$. When the spring force on $m$ becomes equal to the friction force F, sliding between $m$ and M will occur for a range of amplitudes beyond point 2. The effect of the inertia force of $m$ is neglected as being small to simplify the discussion, since the natural frequencies of the damper ring as a separate entity are much higher than the stator natural frequencies due to the absence of pole masses.

Figure 12:
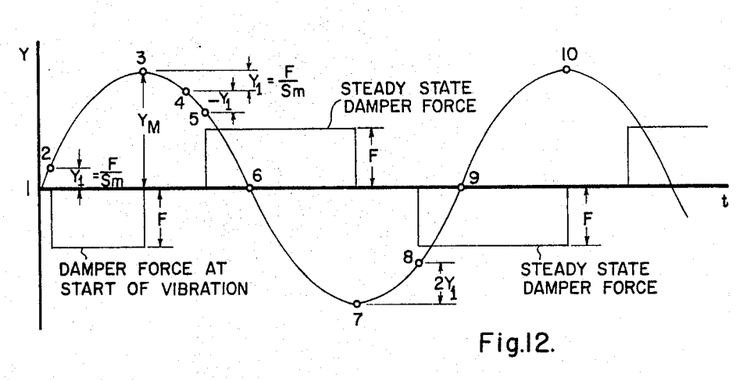

Thus, relative sliding between frame and damper ring starts at point 2 and persists until the peak amplitude of $y_M$ is reached at point 3. When the motion of M reverses beyond point 3, the damper mass will move with M without sliding as $y_m$ changes from $y_1$ to 0 during the interval while M moves from point 3 to point 4, and again as $y_m$ changes from 0 to $-y_1$ as M moves from point 4 to point 5. At point 5, $S_m(-y_1)$ again is equal to the friction force F, and sliding occurs in the direction to make F oppose the downward displacement of M. This sliding force lasts until point 7 is reached. Upon a reversal of the direction of movement of M, the slip cycle is repeated at points 8, 9 and 10. During the time interval between points 5 and 7, the energy dissipated by sliding friction is equal to F times the relative displacement between M and $m$, or $E_{5-6} = F(y_M - 2y_1 + y_M) = 2F(y_M - y_1)$. Let $y_M - 2y_1$ be the displacement from 5 to 6, while $y_M$ is that from point 6 to point 7. The total energy dissipation per cycle of vibration $E_d$ is given by the equation $$E_d = 4F(y_M - y_1) = 4F(y_M - F/S_m)$$

The energy input by P to the vibration at resonance is per cycle $$E_i = \int_0^{\frac{2\pi}{\omega}} P \cos \omega t \, y_M \omega \cos \omega t \, dt = \pi P y_M$$

Since $E_d$ equals $E_i$ for the steady state resonance peak of M the following equation is obtained:

$$y_M = \frac{4F^2}{S_m(4F - \pi P)}$$

It is seen from the last equation that one requirement for F is that F must greater than $\pi P/4$ to avoid a theoretically infinite resonance peak, if no other damping is provided.

It is also noted that the last equation for $y_M$ shows that a minimum peak amplitude of vibration of the frame occurs when $$F = \frac{\pi P}{2}$$

This optimum value is thus:

$$y_{M\,min} = \frac{\pi P}{S_m}$$

The amplitude for a statically applied P to the combined stiffness $S_M + S_m$ is:

$$y_{M_S} = \frac{S}{S_M + S_m}$$

Accordingly, the amplitude magnification ratio at resonance with the Coulomb damper is given by the formula:

$$\frac{y_M}{y_{M_S}} = \frac{\pi P/S_m}{\frac{P}{S_M + S_m}} = \pi\left(\frac{S_M}{S_m} + 1\right)$$

It is seen that this quantity $y_M/y_{M_S}$ approaches $\pi$ as $S_m$ becomes larger and larger compared to $S_M$.

Figure 9:
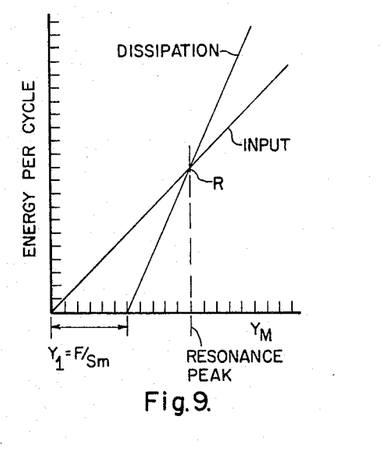

Reference is made now to FIG. 9 which illustrates graphically the energy input and energy output balance expressed by the aforementioned equations. The slope of the input line is $\pi P$ while the slope of the dissipation line is $4F$. It will be seen that from a study of the above-mentioned equations when F is less than $\pi P/4$ the lines diverge and have no intersection point in the positive $E$—$y_M$ plane. At $$F = \frac{\pi}{4}P$$

the lines are parallel and intersect at infinity. Only as F becomes greater than $\pi P/4$ the finite intersection point of the two lines represents the steady state peak resonant amplitude of the system. The scale of the ordinate represents energy per cycle, and to broaden the illustration no values are applied to the scale units. If values were applied to the ordinate scale, "energy per cycle," the dissipation and input lines would be for particular values of $S_m/S_M$. It is seen from a study of the graph of FIG. 9 that dissipation of energy does not start until the value of the displace $y_M$ attains a predetermined value. This value at which slippage starts is represented by $y_1$ and is equal to $F/S_m$; from the point on the abscissa where $$y_1 = \frac{F}{S_m}$$

the dissipation line slopes upward at an angle of 4F until the line crosses the input line at the point R. This point R represents a stable operating point, that is, the peak amplitude or so-called resonant peak which vibration can reach.

It is further noted from a study of FIG. 9 that as F increases, the point on the abscissa where $$y_1 = \frac{F}{S_m}$$

moves to the right.

Figure 10:
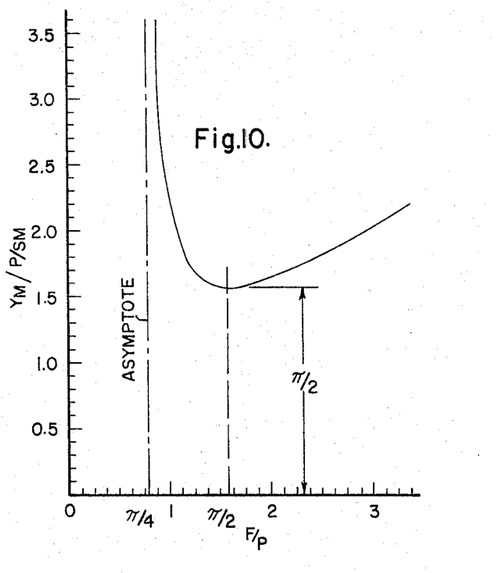

Particular reference is made now to FIG. 10, which is a graph in which $$\frac{y_M}{\frac{P}{S_M}}$$

is plotted as a function of $F/P$. The portion of the curve to the left of the optimum value of F is asymptotic to the vertical line through $$F = \frac{\pi}{4}P$$

To the right of $$F = \frac{\pi}{2}P$$

the amplitude rises again, but the slope of the curve is more gradual. In FIG. 10, the abscissa represents values of $F/P$ and the ordinate scale represents values of $y_M/P_{S_M}$. Thus, the ordinate of FIG. 10 is the point on the intersection of the curves of FIG. 9. By way of illustration, the curve of FIG. 10 is for resonant peaks where $S_m/S_M$ has a value of 2. It is further noted from the study of FIG. 10 that the resonant peak varies depending on the ratio of friction to disturbing forces. In understanding FIG. 10, it may be helpful to bear in mind that with reference to the ordinate scale, $y_M$ is a dynamic factor, whereas $P/S_M$ is a unit of measure, that is, the amplitude the disturbing force would produce if it were applied statically to the frame of the motor.

Particular reference is made now to FIG. 8, in which the resonance magnification ratio is shown as a function of $S_m/S_M$, that is, the ratio of damper ring stiffness to frame stiffness. A value of $S_m/S_M$ equal to about 2 represents a practical limit which can be achieved without too much hardship. Assuming the frame and rings are composed of the same material or materials having the same modulus of elasticity, since the bending stiffness for the numerous non-extensional modes of frame vibration is directly proportional to the moment of inertia of the frame section about its long axis through its center of gravity, we have for 2 damper rings:

$$\frac{S_m}{S_M} = \frac{2bT^3}{Bt^3}$$

in which $b$=axial breadth of each damper ring
$T$=radial thickness of each damper ring
$B$=axial breadth of stator frame section
$t$=radial thickness of stator frame section.

Accordingly, for a practical and easily obtainable ratio $$\frac{S_m}{S_M} = 2, \text{ then } T = t\left(\frac{B}{b}\right)^{1/3}$$

By way of example, and illustrating the last formula, suppose a direct current propulsion motor has a frame diameter of 60 inches, a frame breadth of 24 inches, and a frame thickness of 2 inches. In order to limit the resonance magnification ratio to $3\pi/2$, two damper rings are required, each having an axial breadth of 2 inches, and a radial thickness T given by the formula $$T = 2\sqrt[3]{\frac{24}{2}} = 4.59''$$

In the case of the two extensional modes of FIGS. 1A and 1B, the mode stiffness is proportional to the cross sectional area of the stator frame. Hence, the change in damper ring diameter due to the friction forces of radial sliding will also be opposed by a stiffness factor proportional to the cross sectional area of the damper rings. In the assumed example, having the dimensions stated hereinbefore, the stiffness ratio thus becomes $$\frac{S_m}{S_M} = \frac{2 \times 2 \times 4.59}{2 \times 24} = .328$$

The corresponding value of the resonance ratio for these modes is given by the equation:

$$\frac{y_M}{y_{MS}} = \pi\left(\frac{1}{.382} + 1\right) = 11.4$$

With respect to the resonance ratio of $(3/2)\pi = 4.71$, for the non-extensional modes of FIG. 1, this represents an increase in noise of 7.7 decibels. Since there are just two extensional modes involved, they can perhaps be better avoided altogether by designing them to be outside the speed range of the motor.

Figure 13:
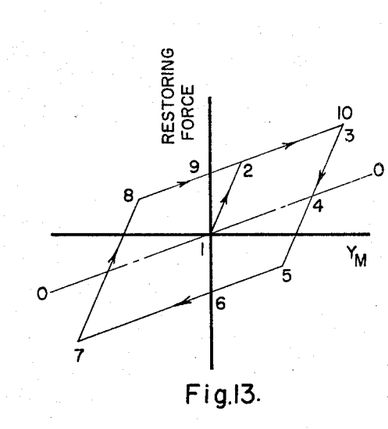

Particular reference is made now to FIG. 13, which shows restoring force as affected by a spring Coulomb damping. The abscissa represents $y_M$, that is, the deflection of the frame, whereas the ordinate represents restoring force. The area of the curve represents the energy absorbed by the damper rings. This curve of FIG. 13 is illustrative of the principles of operation described hereinbefore. During the start of a resonant condition at a particular augmented mode frequency, as the system amplitude $y_M$ reaches $\pi P/2S_m$ and then begins to exceed it, the mode natural frequency will begin to decrease since the effective system restoring force decreases when the damper surfaces begin to slip. Plotting the restoring force versus vibration amplitude gives the curve of FIG. 13. This is the characteristic curve of a spring with Coulomb friction hysteresis. The slope of the slanted line O—O through the origin represents the initial stiffness of the stator frame alone. The numbers in FIG. 10 represent the corresponding numbers in the stator displacement curve of FIG. 12. From 1 to 2, frame and damper rings move together, from 2 to 3 slip occurs, from 3 to 5 frame and rings again move together, from 5 to 7 slip occurs, from 7 to 8 frame and rings move together, and slip again from 8 to 10 brings us back to point 3. The damper thus combines a resonance detuning action with its energy absorbing function.

Under certain conditions of operation, as might occur in a submarine drive motor, it is possible for a condition to exist in which the magnetic disturbing force changes its frequency continuously to follow the changing natural frequency of the stator damper system. This could occur, for example, if the motor were gradually slowing down after it entered the condition of frame resonance. In that case, the system amplitude would build up to a value approaching $\pi P/S_m$ by tracing several concentric hysteresis loops as the process occurred, each similar to the loop of FIG. 13. However, in no case would the peak amplitude exceed $\pi P/S_m$.

The presence of the damper rings is also beneficial at points away from resonance. If the total system stiffness is increased to 3 times its initial value, for example, by making $S_m/S_M=2$, the expected decrease in non-resonant amplitudes to a noise level of 9.55 decibels lower for a given disturbing force is obtained.

Particular reference is made now to FIGS. 6 and 7, in which a second embodiment of the invention is shown. It is seen that the frame of the motor has feet 141 and 142 and has two rows of lugs extending therefrom, the lugs being positioned at spaced intervals around the periphery of the frame in parallel circular paths, with the lugs in each path being disposed opposite each other. The motor has shaft 150. In FIG. 6, these lugs are designated 91 on one side of the frame, and 96 on the other side of the frame. Flattened conical springs 101 and 106 are shown disposed between the lugs and the adjacent damper rings, designated 87 and 88. Bolts 111 and 116 respectively having resilient sleeves 121 and 126 respectively attach the damper rings to the lugs and accordingly to the frame 83.

Particular reference is made now to FIG. 7 which shows an end elevation of the motor of FIG. 6. It is seen that adjacent each damper ring, the series of spaced lugs are spaced around the entire periphery of the motor frame which may stand upon the feet 142 and 143, other feet not shown in FIG. 7, corresponding to these being disposed at the other end of the dynamo or motor frame.

There has been provided then apparatus well suited to accomplish the aforedescribed objects of the invention. The Coulomb friction damper limits resonance peaks of vibration to a reasonably small amplitude. Furthermore, the Coulomb friction damper forces reach their peak value after only a small fraction of the maximum frame deflection. The peak value of the damping forces is independent of the low magnitude of the vibratory velocity; and the forces are equally effective against all reasonably foreseen modes of frame vibration. The damper rings are easily constructed and may be applied to existing dynamoelectric machines by a person of only average skill in the rotating machinery electrical art.

Whereas the damping elements are described herein as "rings," it should be understood that, if necessary, the elements could extend less than a circumferential distance, could be sectionalized, could be other than ring-shaped, with perhaps some loss of damping efficiency.

Whereas the invention has been shown and described with respect to some embodiments thereof which give satisfactory results, it should be understood that changes may be made and equivalents substituted without departing from the spirit and scope of the invention.

I claim as my invention:

1. Vibration damping apparatus for use with a dynamoelectric machine having a cylindrical frame comprising, in combination, first and second rigid damper devices separately disposed in predetermined positions with respect to the ends of the frame respectively, means for attaching the damper devices to the frame, means for providing sliding friction forces opposing relative displacement between the frame and damper devices in a radial direction.

2. Vibration damping apparatus according to claim 1 in which the frame is characterized as having a first predetermined stiffness and the damper devices are characterized as having a second predetermined stiffness greater than the first predetermined stiffness.

3. In damper apparatus for a dynamoelectric machine having a substantially cylindrical metallic frame, in combination, a pair of rigid damper rings mounted in predetermined positions with respect to the ends of the frame respectively, and means for attaching each of said damper rings to the frame, the attaching means permitting some sliding movement in a radial direction between the damper rings and the frame, means for providing frictional forces between the frame and the damper rings that oppose relative displacements greater than a predetermined amount in a radial direction between the frame and rings.

4. A vibration damped dynamoelectric machine having a cylindrical frame, the cylindrical frame being composed of a preselected material and having a first predetermined elastic compliance, comprising, in combination, first and second damper rings composed of a preselected material and having a second predetermined elastic compliance which is less than the elastic compliance of the frame, and a plurality of means for each damper ring coupling the ring to the frame by friction forces, said friction forces being substantially independent of the velocity of relative motion in a radial direction between the frame and the damper ring.

5. Vibration damping apparatus for a dynamoelectric machine including a cylindrical frame having a predetermined stiffness, said frame having a plurality of longitudinally extending threaded bores in each end at spaced intervals around the periphery thereof, comprising, in combination, first and second damper rings having a stiffness greater than the stiffness of the frame and disposed on the ends of the frame respectively, each of said damper rings having a plurality of bores therethrough in alignment with the bores in the adjacent end of the frame, a plurality of spring loaded bolts in said bores and attaching the rings to the frame, the bores in the rings being of greater diameter than the bolts, a plurality of sleeves composed of resilient material for the plurality of bolts respectively, and a plurality of conical friction washers for the plurality of bolts, the washers separating the damper rings from the frame and forming friction surfaces for frictionally coupling the damper rings to the frame while permitting relative movement of the damper rings with respect to the frame in a radial direction.

6. A vibration damped dynamoelectric machine comprising, in combination, a cylindrical frame having a predetermined stiffness, said frame having a plurality of longitudinally extending threaded bores in each end at spaced intervals around the periphery thereof, first and second damper rings having a stiffness greater than the stiffness of the frame and disposed on the ends of the frame respectively, each of said damper rings having a plurality of bores therethrough in alignment with the bores in the adjacent end of the frame, a plurality of spring loaded bolts in said bores and attaching the rings to the frame, and a plurality of conical friction washers for the plurality of bolts, the washers separating the damper rings from the frame and forming friction surfaces for frictionally coupling the damper rings to the frame while permitting relative movement of the damper rings with respect to the frame in a radial direction.

7. A vibration damped dynamoelectric machine comprising, in combination, a cylindrical frame composed of a preselected material and having a first stiffness, first and second damper rings mounted on the ends of the frame respectively, the rings being composed of a preselected material and having a second stiffness which is greater than the first stiffness, and a plurality of means for each damper ring for coupling the ring to the frame by friction forces which are substantially independent of the velocity of relative motion in a radial direction between the frame and the damper ring, said last named means including conical washers interposed between the ring and the frame.

8. Damper apparatus for a dynamoelectric machine having a substantially cylindrical frame comprising, in combination, first and second parallel rows of lugs disposed at spaced intervals around the periphery of the frame on the outer side thereof in predetermined positions with respect to the ends of the frame respectively, first and second damper rings disposed adjacent the plurality of spaced lugs, said lugs having bores therein, said damper rings having bores therein in alignment with the bores in the lugs while the damper rings are mounted on the frame, a plurality of friction washers disposed between the lugs and the damper rings, and a plurality of spring-loaded bolts in the bores in the rings and the bores in the lugs and fastening the damper rings and the lugs securely against the adjacent faces of the washers, the washers coupling the damper rings to the lugs by frictional forces while permitting small relative movement in a radial direction of the damper rings with respect to the lugs and accordingly with respect to the frame.

9. Apparatus according to claim 8 wherein the damper rings are additionally characterized as having stiffness values which are at least twice the value of the stiffness of the frame of the dynamoelectric machine.

10. Coupling means for coupling a vibration damping member to the frame member of a dynamoelectric machine to provide a vibration-damping frictional force between the damper member and the frame member while permitting some movement of the damper member relative to the frame member in a radial direction, comprising, in combination, a plurality of spring loaded bolt means joining the damper member and frame member, and a plurality of conical washers disposed between the frame member and the damper member, each spring forcing the associated washer into a substantially flat condition whereby the washer couples the damper member to the frame member by frictional force while allowing some relative movement of the damper member with respect to the frame member, said frictional forces being substantially independent of the velocity with which the damper member moves with respect to the frame member.

References Cited by the Examiner

UNITED STATES PATENTS

| | | | |
|---|---|---|---|
| 1,688,891 | 10/1928 | Spreen | 310—51 |
| 2,419,159 | 4/1947 | Pezzillo | 310—51 |
| 2,620,151 | 12/1952 | Peters | 310—51 X |
| 2,830,205 | 4/1958 | Castagna | 310—51 X |
| 2,900,537 | 8/1959 | Morse | 310—51 |
| 3,179,827 | 4/1965 | Baker | 310—89 |

FOREIGN PATENTS

| | | |
|---|---|---|
| 952,197 | 11/1956 | Germany. |
| 1,007,418 | 3/1957 | Germany. |

MILTON O. HIRSHFIELD, *Primary Examiner.*

J. W. GIBBS, *Assistant Examiner.*